US012211387B2

(12) United States Patent
Watson

(10) Patent No.: US 12,211,387 B2
(45) **Date of Patent: *Jan. 28, 2025**

(54) AUTONOMOUS AIR TAXI SEPARATION SYSTEM AND METHOD

(71) Applicant: Airspeed Systems LLC, Chicago, IL (US)

(72) Inventor: Craig M. Watson, Chicago, IL (US)

(73) Assignee: Airspeed Systems LLC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,863

(22) Filed: Sep. 1, 2023

(65) Prior Publication Data

US 2023/0410667 A1 Dec. 21, 2023

Related U.S. Application Data

(63) Continuation of application No. 18/057,325, filed on Nov. 21, 2022, now Pat. No. 11,749,123, which is a continuation of application No. 17/871,175, filed on Jul. 22, 2022, now Pat. No. 11,508,246, which is a continuation-in-part of application No. 17/700,382, filed on Mar. 21, 2022, now Pat. No. 11,636,769, (Continued)

(51) Int. Cl.
*G08G 5/00* (2006.01)
*G08G 5/04* (2006.01)

(52) U.S. Cl.
CPC ......... *G08G 5/0039* (2013.01); *G08G 5/0013* (2013.01); *G08G 5/0021* (2013.01); *G08G 5/0026* (2013.01); *G08G 5/0043* (2013.01); *G08G 5/0052* (2013.01); *G08G 5/045* (2013.01)

(58) Field of Classification Search
CPC .. G08G 5/0039; G08G 5/0013; G08G 5/0021; G08G 5/0026; G08G 5/0043; G08G 5/0052; G08G 5/045; G08G 5/0008
See application file for complete search history.

(56) References Cited

U.S. PATENT DOCUMENTS 7,136,016 B1 11/2006 Swensen et al.
8,108,087 B2 1/2012 Stone et al.
(Continued)

FOREIGN PATENT DOCUMENTS

JP 2022-147583 A 10/2022
WO WO 2021/079108 A1 4/2021

OTHER PUBLICATIONS

U.S. Appl. No. 17/492,904, filed Oct. 4, 2021.
(Continued)

*Primary Examiner* — Andrew W Bee
(74) *Attorney, Agent, or Firm* — Leydig, Voit & Mayer, Ltd.

(57) ABSTRACT

A system for urban air mobility monitors flight separation for compliance with a safe separation distance. A reference formation airspace is established for a reference air taxi based on minimum longitudinal, lateral and vertical parameters. When penetration of the reference formation airspace is detected, a penetration airspace is established. A centroid of the penetration airspace is determined and a target separation to the centroid is supplied to the air taxi to reestablish safe separation. The extent of separation is also safely contained by the presence of virtual air taxis whose positions on the periphery of the penetrated airspace serve to limit potential penetration of surrounding air taxi air spaces.

7 Claims, 11 Drawing Sheets

Related U.S. Application Data which is a continuation of application No. 17/492,904, filed on Oct. 4, 2021, now Pat. No. 11,282,398.

(56) References Cited

U.S. PATENT DOCUMENTS

| | | | |
|---|---|---|---|
| 8,744,738 | B2 | 6/2014 | Bushnell |
| 9,137,847 | B1 | 9/2015 | Ayyagari et al. |
| 9,536,435 | B1 | 1/2017 | Shay |
| 10,302,759 | B1 | 5/2019 | Arteaga |
| 10,777,086 | B2 | 9/2020 | Barker |
| 10,867,519 | B2 | 12/2020 | Mecklem et al. |
| 11,282,398 | B1 | 3/2022 | Watson |
| 11,749,123 | B2 | 9/2023 | Watson |
| 2005/0200501 | A1 | 9/2005 | Smith |
| 2010/0292871 | A1 | 11/2010 | Schultz et al. |
| 2014/0197981 | A1 | 7/2014 | Hartley et al. |
| 2017/0083979 | A1 | 3/2017 | Winn et al. |
| 2017/0084183 | A1 | 3/2017 | Knox |
| 2017/0103660 | A1 | 4/2017 | Shafaat et al. |
| 2018/0366012 | A1 | 12/2018 | Glatfelter |
| 2021/0197966 | A1 | 7/2021 | Zhang et al. |
| 2023/0103905 | A1 | 4/2023 | Watson |

OTHER PUBLICATIONS

U.S. Appl. No. 17/700,382, filed Mar. 21, 2022.

U.S. Appl. No. 17/871,175, filed Jul. 22, 2022.

U.S. Appl. No. 18/057,325, filed Nov. 21, 2022.

Japan Patent Office, Notice of Reasons for Rejection in Japanese Patent Application No. 2022-561625 (Nov. 22, 2023).

Brittain et al., "A Deep Multi-Agent Reinforcement Learning Approach to Autonomous Separation Assurance," arXiv:2003.08353v2 [cs.LG], Aug. 27, 2020, 26 pages.

Connors, "Understanding Risk in Urban Air Mobility: Moving Towards Safe Operating Standards," *NASA STI Program,* Document No. NASA/TM-20205000604 (Feb. 2020).

Ramasamy, "Next Generation Flight Management Systems for Manned and Unmanned Aircraft Operations—Automated Separation Assurance and Collision Avoidance Functionalities," Ph.D. Thesis, RMIT University, Feb. 2017, 366 pages.

AUTONOMOUS AIR TAXI SEPARATION SYSTEM AND METHOD

CROSS-REFERENCE TO RELATED APPLICATIONS

This patent application is a continuation of U.S. patent application Ser. No. 18/057,325, filed Nov. 21, 2022, which is a continuation of U.S. patent application Ser. No. 17/871,175, filed Jul. 22, 2022, which is a continuation-in-part of U.S. patent application Ser. No. 17/700,382, filed Mar. 21, 2022, which is a continuation of U.S. patent application Ser. No. 17/492,904, filed Oct. 4, 2021, all of which are incorporated by reference in their entirety herein.

TECHNICAL FIELD

This disclosure relates generally to urban air taxi and related air mobility vehicle position control and management, whether crewed or uncrewed, and more particularly to a method and system for monitoring and managing separation for multiple air taxis in a shared airspace.

BACKGROUND

Urban air mobility (UAM) generally refers to the operations of manned and unmanned vertical takeoff and landing (VTOL and eVTOL for electric) vehicles intended to operate in Class E and Class G airspace (as specified by Federal Aviation Administration airspace visual flight rules (VFR) regulations), respectively between 0 and 700 feet and 700 to 1,200 feet above ground level (AGL) in metropolitan areas with or without designated airfields. Herein, such vehicles will be referred to as "air taxis" to distinguish them from conventional aircraft flying at higher altitudes and subject to established air traffic management controls and separation standards. Such an air taxi can include a relatively small unmanned delivery drone, as well as a relatively large piloted or unpiloted craft that transports large items and/or passengers.

Current safe spacing requirements for air taxis operating in Class E and G airspace are limited to visibility and cloud clearance standards. Increasingly unpredictable and crowded ground transportation options will lead to increased air taxi demand, correspondingly tighter spacing, and the need for new approaches to controlling air taxi separation. Industry planning documents such as NASA's UAM Vision Concept of Operations (ConOps) UAM Maturity Level (UML)4, acknowledge that UAM air traffic management (ATM) must enable safe, sustained, resilient, close-proximity, multi-vehicle operations in constrained urban environments, including off-nominal situations. Further, to deliver the same scalability and resilience expected from traditional air traffic management, UAM airspace operations will similarly need to have multiple layers of system redundancy, procedural specificity, and technical capability in the areas of communication, navigation, surveillance, and information that inform traditional ATM. However, with formal air traffic management presently only available at higher altitudes and based at local airports, it is expected that UAM air traffic management will need to be provided by third-party services. In other words, there is a need for a more specific and capable urban air taxi traffic system which may be operated by third parties.

At scale, UAM traffic management will depend on layering redundant systems and promoting contingency-based procedures to provide needed safety and efficiency. These will include designated landing and takeoff areas, dedicated routing, geofencing around secured locations (e.g., power stations), safe separation distances, detection and avoidance technology, and control intelligence and warning systems supporting manual intervention to manage traffic flow and avoid imminent collisions. However, these capabilities cannot ensure safety in metropolitan environments with limited visibility, poor weather conditions, inconsistent communication connectivity, nighttime operations, or high traffic density. Accordingly, more recent NASA industry guidance indicates that " . . . much can undoubtedly be achieved through on-board technical improvements. There is an evolving consensus that for on-demand mobility to grow there must be a shift from prescriptive to performance-based guidelines." (Understanding Risk in Urban Air Mobility: Moving Towards Safe Operating Standards, NASA/TM-20205000604, NASA Ames Research Center, Mary Connors, February 2020).

SUMMARY

This disclosure provides a reliable and safe separation strategy for urban air taxis based on automatic and autonomous systems that can be implemented on board all air taxis, and which detects incursions, manages unsafe proximity, and establishes sympathetic (synchronized in time and coordinated in direction) routing. They system enables two or more air taxis to adjust their trajectories in a complementary fashion to avoid unsafe separation, while at the same time minimizing the risk of imposing too closely on other air taxis that may be nearby. This is distinct from conventional detection and avoidance (DAA) techniques which focus on relatively close proximity collision avoidance. Safe separation under existing visual flight rules for UAM vehicles occurs at thousands of feet apart, requiring greater situational awareness and the ability to adjust trajectories to maintain separation.

Disclosed is a system and method for autonomously determining, displaying (e.g., on a display device), and directing the target trajectories each air taxi should fly to regain or maintain safe separation from one or more air taxis in a shared airspace. In an embodiment, the system guides one or more air taxis to independently adjust trajectories to maintain or restore safe air taxi separation, and can do so without central guidance from air traffic control, or any form of communication among pilots to coordinate their respective maneuvers.

Also disclosed is a system and method for determining, displaying, and implementing how two or more air taxis in too close proximity can safely and autonomously maneuver to regain safe separation without the intervention of air traffic controllers, without any communication between the pilots of the air taxis, and without direct coordination or linkage between the systems onboard each air taxi. The disclosed system installed on multiple air taxis independently directs each to restore safe separation through complementary recovery actions completely autonomously. Resulting benefits include safer trips, reduced burden on pilots, and a clearer roadmap to air taxi separation at scale.

A system installed on all air taxis and promising to deliver autonomous safe separation of air taxis thousands of feet apart may satisfy three conditions to be effective: First, it must be able to detect air taxis in its relevant airspace and determine their position, trajectory and speed. Second, it must be able to independently direct each air taxi in such a way that they move mutually toward restoring separation.

Finally, the movement toward separation needs to be contained so that the movement itself does not risk penetrating other air taxi airspace.

In an embodiment, two features enable the achievement of safe and autonomous separation: First, a system-generated initial reference formation airspace establishes a sphere or "bubble" of virtual surrounding air taxis based on a formation of a set of virtual air taxis positioned at the safe or regulatory minimum longitudinal, minimum lateral, and minimum vertical separation positions around the current position of a reference air taxi. For example, the spheres of 6 virtual air taxis arrayed evenly around the reference air taxi may be sufficient to represent possible surrounding traffic. The positioning of these virtual air taxis forms a set of spheres around the center reference air taxi. This is the baseline for defining safe separation and therefore for identifying penetration of this reference formation airspace.

The second feature is the application of centroid vectoring to establish a target separation vector to restore safe separation between air taxis. The centroid is the geometric balance point computed within any space, and may be an ideal target for establishing a vector toward separation. According to an embodiment, two air taxis, which have either penetrated their respective airspaces or are on a path that would result in airspace penetration, may be given target separation vectors to redirect them to the centroids of their respective penetrated airspaces. Thus directed, each of the air taxis will independently move in a way that restores safe separation for both air taxis, while also maintaining separation from the virtual air taxis on station around the original perimeter of each air taxis which act as proxies for any other air taxis that might be close or approaching to minimum separation distance.

The air taxi at the center of the reference formation airspace is referred to as the "reference air taxi," and it occupies the centroid of its respective reference formation airspace. In physics and geometry, a centroid is the mean position within a particular space, and represents the geometric center of the space. As such, the properties of the centroid make it ideal as a guiding position: it is always at the geometric center of the reference formation airspace, however uniform or uneven; it is always inside the reference formation airspace; and the centroid can be calculated through a mathematical computation within the capability of onboard avionics equipment. In an embodiment for air taxis, the reference formation airspace forms a sphere, and the centroid is at the intersection of at least two diameters of the sphere, positioning it at the three-dimensional center of the sphere.

When incursion of an airspace occurs among two or more air taxis, the reference formation airspace of at least one air taxi is penetrated and thus deformed, causing each air taxi to no longer occupy the centroid position relative to its original formation airspace (because the formation airspace itself has been distorted by the penetration). In an embodiment, each air taxi equipped with the disclosed system is autonomously provided a target separation vector determined based on the new "penetration airspace" defined by the positions of the original surrounding virtual air taxis, plus the position of the penetrating air taxi. All of these positions are known: the virtual air taxis are known with precision based on their position relative to and moving in tandem with the reference air taxi, enabling the presence, distance, direction, and position of each virtual air taxi to be calculated precisely. The reference air taxi's sensors can also track a penetrating air taxi with precision using position data received by the air taxi's GPS system and/or other onboard DAA sensors, such as phased array radar and electro-optical systems. Each air taxi's autonomous separation unit (ASU) generates the dimensions of the penetrated airspace based on both virtual and penetrating air taxi positions. Based on these inputs, a new centroid is determined for each air taxi relative to its own now-penetrated airspace. With the new centroid located, each air taxi's ASU system generates a target separation vector to that position. Each air taxi's heading toward the centroid of its penetrated airspace represents an optimal separation solution with three essential features: (a) each air taxi's penetrated airspace is distinct; (b) each heading will always be away from the other penetrating air taxi, because their centroids are positions in different formations; and (c) the separation vector each air taxi follows will always be inward to its respective penetrated airspace, thus maintaining separation from any actual air taxis close to the air taxi's perimeter, as well as those represented by virtual air taxi positions.

Several features of this autonomous resolution of safe separation make it an appealing solution to the problem of maintaining safe separation among air taxis without requiring either pilot or human controller intervention:

a. The reference formation airspace configured based on virtual air taxi positions can be set based on any desired longitudinal, lateral, or vertical separation distances, and does not depend on receiving real data from other air taxis or systems, nor does it have to be constrained to a spherical shape; an ellipsoid or ovoid shape might also be used to describe the reference airspace, and the reference airspace might also change dynamically with movement of the reference air taxi.

b. While the reference formation airspace is notional, it has real distance and coordinates around the reference air taxi, and these move with the air taxi in a "flying bubble;"

c. The reference formation airspace may be comprised of six virtual air taxis, four air taxis arrayed around the center of the bubble, and one each on the uncovered sides, resulting in complete coverage. Any additional bubbles would intersect outer air taxis before coming within the perimeter range of the reference air taxi. When the reference formation airspace is penetrated, the penetrating air taxi is tracked using the existing onboard DAA sensors or GPS coordinates and evaded, but the remaining virtual air taxis also ensure that the resulting separation trajectory is a vector that represents all the air taxis that could possibly be nearby or approaching from any direction;

d. The resulting penetrated airspace is a combination of the original reference formation airspace (some of the bubbles of which may not be impacted by the penetration), and the new coordinates of the penetrated portion of the penetration airspace;

e. The coordinates of the newly-formed penetrated airspace are known through a combination of original reference formation airspace coordinates and new position data of the at least one penetrating air taxi;

f. Based on these coordinates, a penetrated airspace is generated and its centroid is determined, a process that can be performed dynamically as the penetrating air taxi continues to move, changing separation;

g. The centroid of the penetrated airspace is defined in relation to the virtual air taxis and the penetrating air taxi, and is calculated with sufficient precision to generate a destination point with a specific position in relation to the reference air taxi. This enables a bearing and airspeed to be set to give the reference air taxi a new heading to move toward the centroid of the penetrated airspace;

h. Each penetrating air taxi may generate its own penetration airspace and each will set course to its own new centroid;

i. Because each centroid is at the geometric center of its own penetrated airspace, and because the centroid will always move away from the point of penetration, each air taxi's movement toward its own centroid will always be along a vector moving away from other air taxis.

In an embodiment, the system does more than conventional detection and avoidance systems, which merely help alert a pilot or operator to conflict and then select an existing route around an approaching air taxi, or slow the speed of approach between them. By contrast, the ASU enables modifications that adjust air taxi trajectories so spacing is maintained without the need for predefined alternate routes.

Embodiments of the disclosed system have benefits for air taxi pilots and for air traffic controllers:

a. For a single pilot in command, the system is embodied in an onboard ASU that shows on the existing flight management system display the path to restoring safe separation among possibly multiple penetrating air taxis;

b. For multiple pilots each piloting an air taxi in the same shared airspace, each equipped with their own ASU, the airspace-specific guidance provided to each simultaneously restores safe separation for all air taxis without requiring any form of communication among pilots or air taxi systems. For both individual and multiple pilots, when the system operates in a fully-automated state linked to an air taxi's autopilot, the ASU will make faster and more accurate decisions in the face of changing data and operating conditions that may overwhelm even the most experienced pilots;

c. Finally, for air traffic controllers or third-party supporting operators, the system processes positional data that can determine centroid locations and target separation vectors to direct each air taxi toward its own path based on the air taxis in its airspace, automatically providing ATCs with directional intelligence.

In an embodiment, disclosed is a method for managing air taxi flight separation of a plurality of air taxis in an urban flight region for safe separation or for compliance with a predetermined separation standard based on predetermined separation parameters or dimensions, the method comprising the steps of (1) receiving current position data for each of the air taxis within a target range from a reference air taxi, (2) constructing, for each of the identified air taxis in the air traffic information region, a reference formation airspace in the form of a sphere with dimensions based on the separation parameters, and with the centroid of the formation airspace as the current position of the air taxi, (3) comparing, for a first air taxi in the target range, the reference formation airspace of the first air taxi to the current position of a second air taxi in the target range, to determine if the second air taxi has penetrated the reference formation airspace of the first air taxi, and if the second air taxi has penetrated the reference formation airspace of the first air taxi: (a) constructing a penetration airspace of the first air taxi representing a modification of the reference formation airspace of the first air taxi deformed by the position data of the second air taxi, (b) determining a centroid of the penetration airspace of the first air taxi, and (c) generating a target separation vector defined by the direction from the current position of the first air taxi to the centroid of the penetration airspace of the first air taxi.

In an embodiment, the target separation vector is transmitted to the first air taxi and/or to an air traffic management operator control system associated with safe separation within the urban taxi operating environment.

In an embodiment, the steps of the method are continuously performed in real time for each of the air taxis in the region with respect to all the other air taxis in the flight information region.

In an embodiment, the reference formation airspace may be constructed by defining positions of 6 virtual air taxis spaced about the reference air taxi. Four of the virtual air taxis are located evenly around the reference air taxi on a horizontal plane, and the remaining two virtual air taxis are located above and below the reference air taxi. In alternative embodiments, the airspace may be defined by more or fewer virtual air taxis arranged about the periphery of the reference formation sphere. Further, the penetration airspace may be constructed based upon the set of virtual air taxis with the position of one of the air taxis closest to the penetrating air taxi modified to the position of the penetrating air taxi. In an alternative arrangement, the position of the penetrating air taxi may form an additional point for defining the penetration airspace.

In an embodiment, the method may include configuring a proximity risk trigger defined by a proximity distance, generating a proximity risk warning when another air taxi is within a predetermined proximity distance to the reference formation airspace of an air taxi, and sending the proximity risk warning to least one of the air taxis, the other penetrating air taxi or an urban air traffic management system associated with the flight region.

In an embodiment, disclosed is a method for managing air taxi flight separation of a reference air taxi during flight for compliance with a predetermined safe separation distance or standard, the method including the steps of receiving current position data of the reference air taxi, constructing a reference formation airspace in the form of a sphere with dimensions based upon minimum longitudinal, minimum lateral and minimum vertical separation parameters and the centroid of the formation airspace as the current position of the reference air taxi, defining positions of 6 virtual air taxis spaced about the reference air taxi. Four of the virtual air taxis are located evenly around the reference air taxi on a horizontal plane, and the remaining two virtual air taxis are located above and below the reference air taxi: (1) constructing a penetration airspace defined by the positions of the 6 virtual air taxis wherein the position of one of the virtual air taxis closest to the penetrating air taxi is modified to the position of the penetrating air taxi, (2) determining a centroid of the penetration airspace, (3) generating a target separation vector extending from the current position of the reference air taxi to the centroid of the penetration airspace, and (4) sending the target separation vector to the reference air taxi.

The steps of the method may be performed continuously in real time.

In an embodiment, if an approaching or penetrating air taxi is determined to be within a collision risk distance (for example, as a result of technical failure or pilot error), the method may hand off control to an onboard detection and avoidance system programmed to take emergency action.

In an embodiment, the target separation vector may be sent to an onboard autopilot system, or, if an autopilot system is not present or not engaged, the target separation vector may be displayed on a pilot display.

In an embodiment, the penetration airspace may be defined by the positions of multiple penetrating air taxis and the positions of the multiple virtual air taxis.

In an embodiment, disclosed is a method for managing air taxi flight separation of a reference air taxi during flight for compliance with a predetermined safe separation distance or standard, the method including the steps of receiving position data of the reference air taxi, constructing a reference formation airspace in the form of a sphere with dimensions based upon the minimum longitudinal, lateral and vertical separation parameters and the position of the reference air taxi as the centroid of the reference formation airspace, receiving position data of at least one other air taxi that is nearest to the reference formation airspace, and if the at least one other air taxi penetrates into the reference formation airspace: (1) constructing a penetration airspace representing a modification of the reference formation airspace deformed by at least the position data of the at least one other air taxi, (2) determining a centroid of the penetration airspace, and (3) sending to the reference air taxi a vector representing a direction to the centroid of the penetration airspace.

In an embodiment, the method may define a plurality of virtual positions spaced about the reference formation airspace, and wherein the penetration airspace is represented by the plurality of virtual positions and a penetrating air taxi position.

DRAWINGS

The disclosed embodiments may be understood from the following detailed description taken in conjunction with the accompanying drawings of which:

Figure 5A:
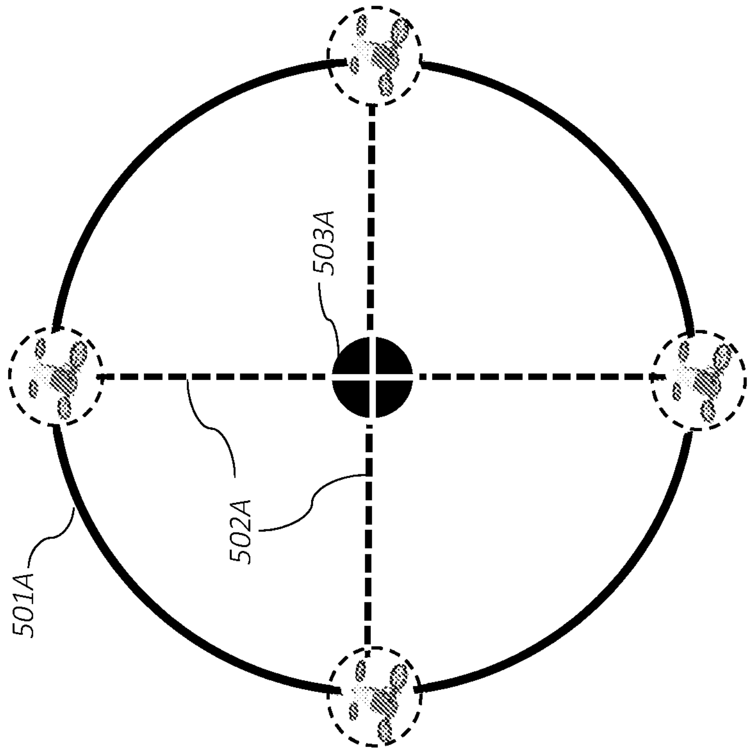
Figure 5B:
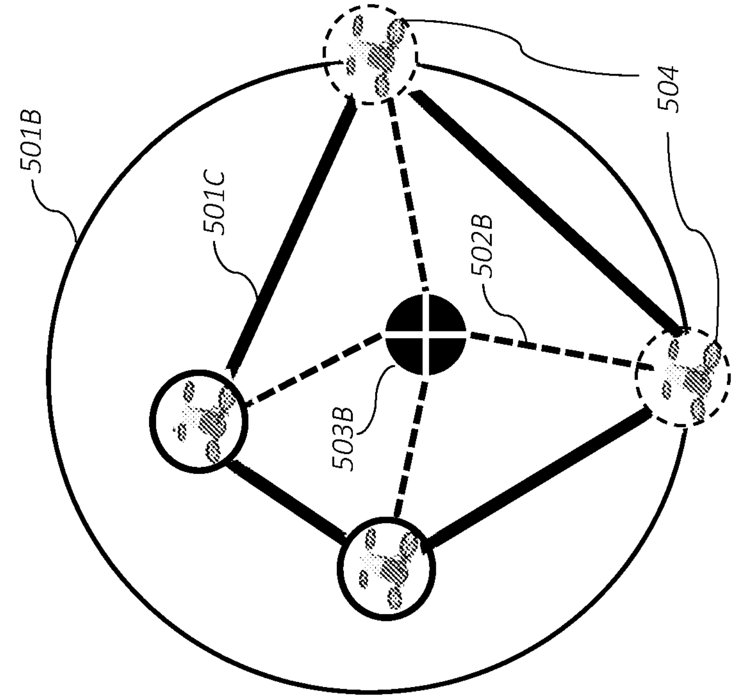
Figure 6B:
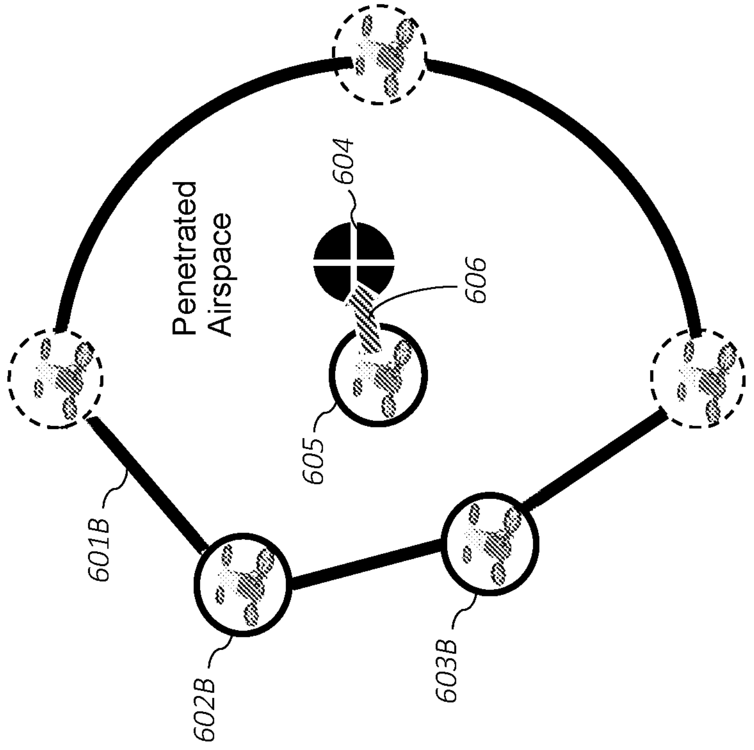
Figure 6A:
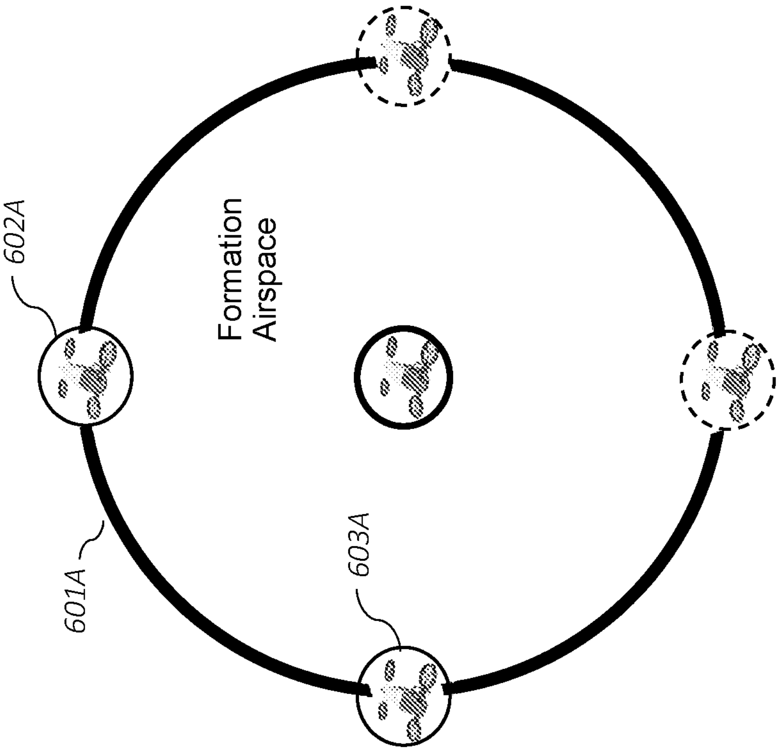
Figure 7A:
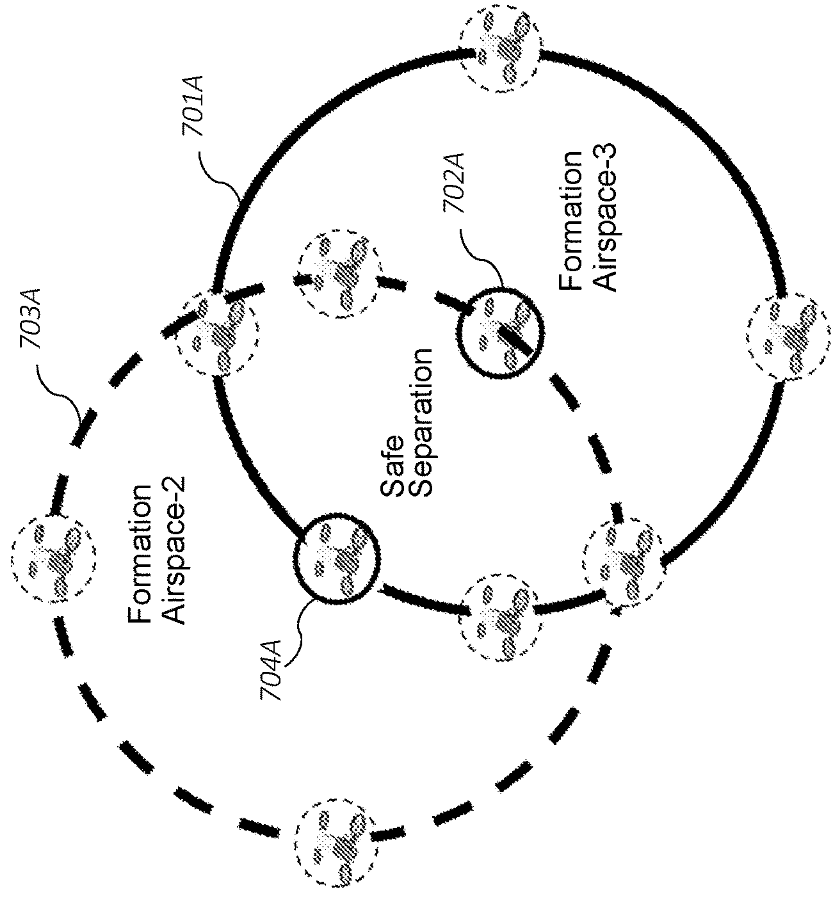
Figure 7B:
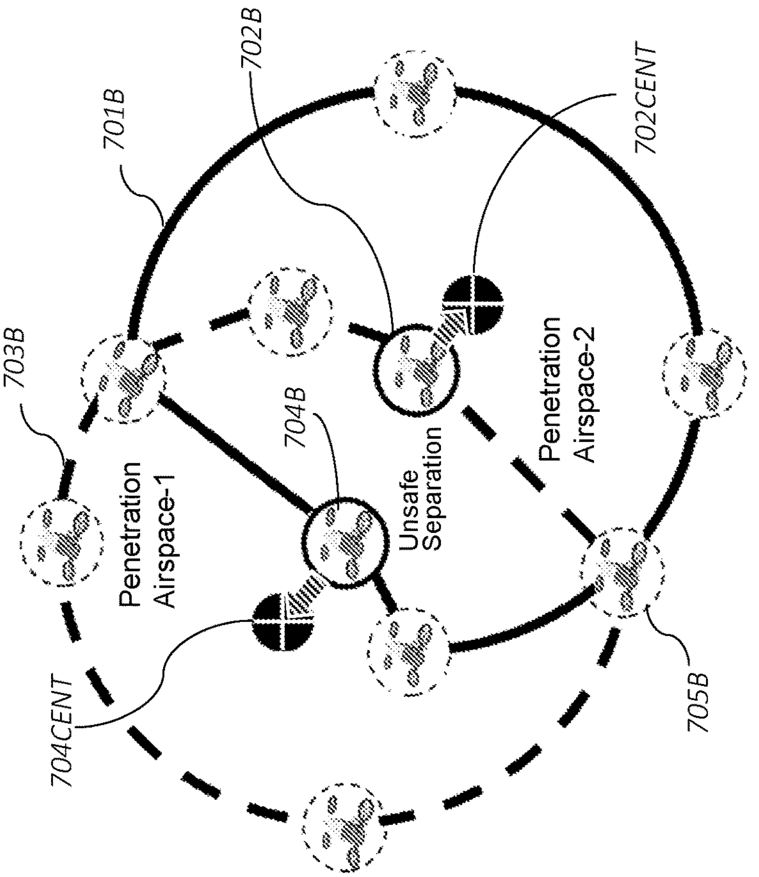
Figure 8:
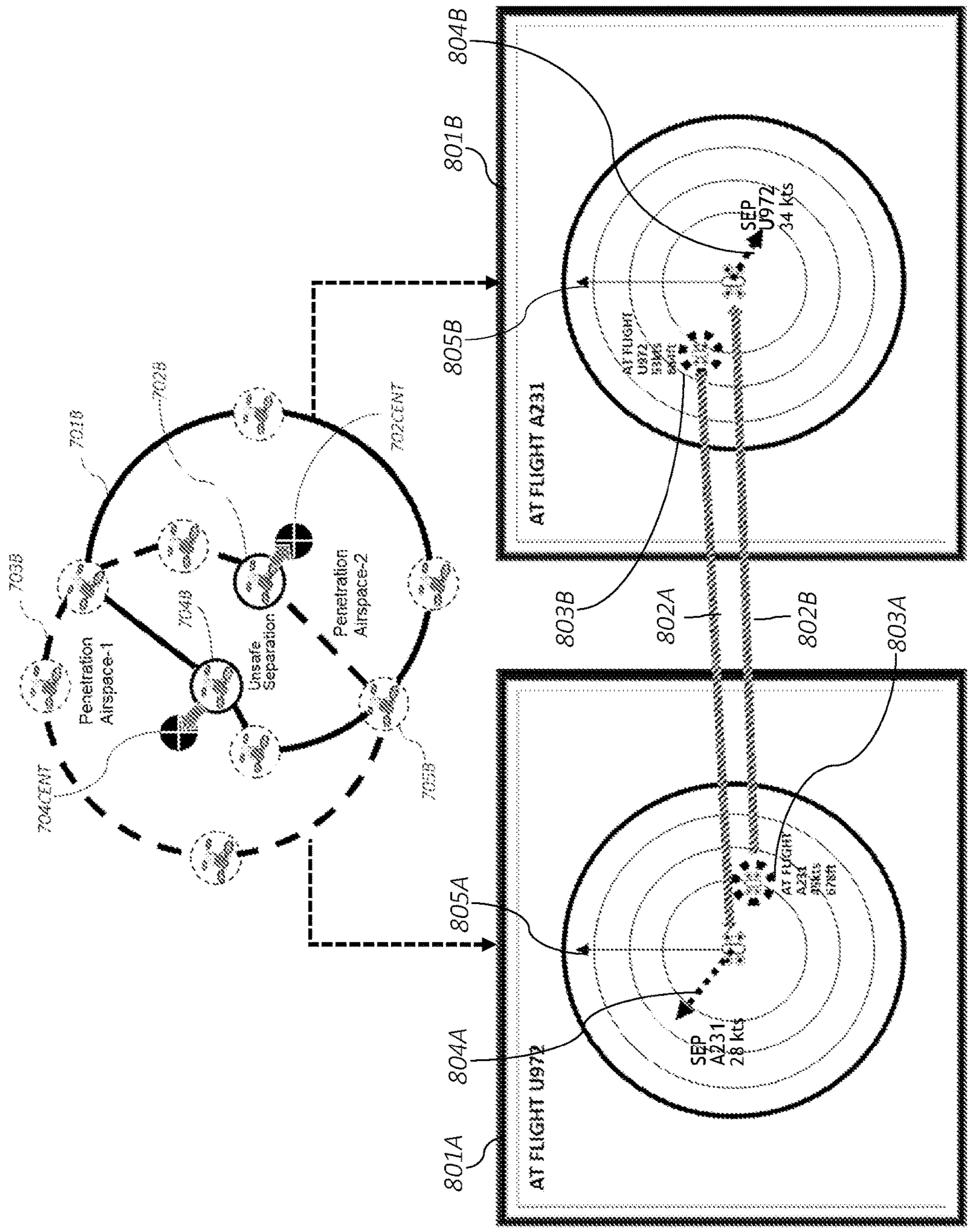
Figure 9:
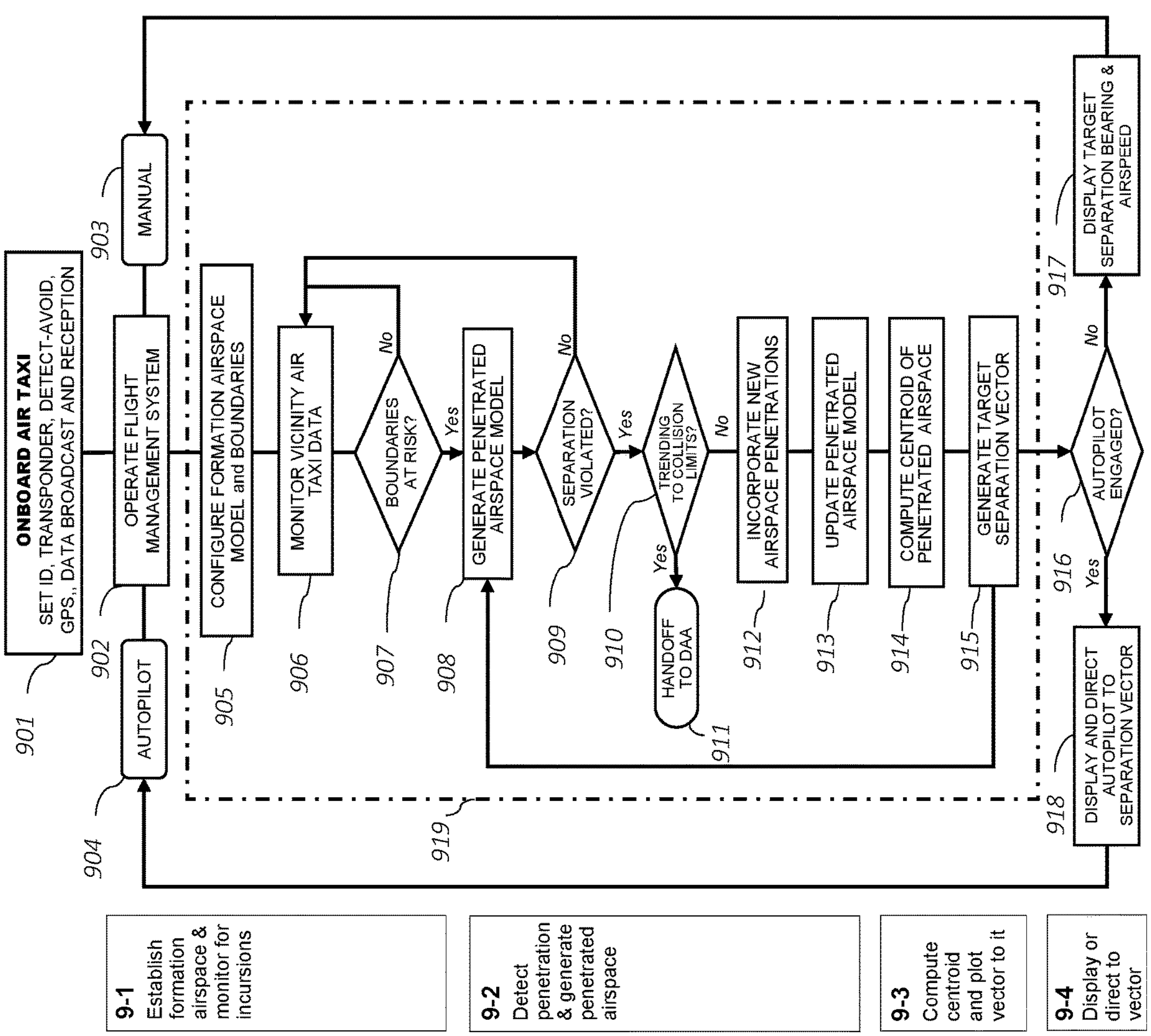
Figure 10:
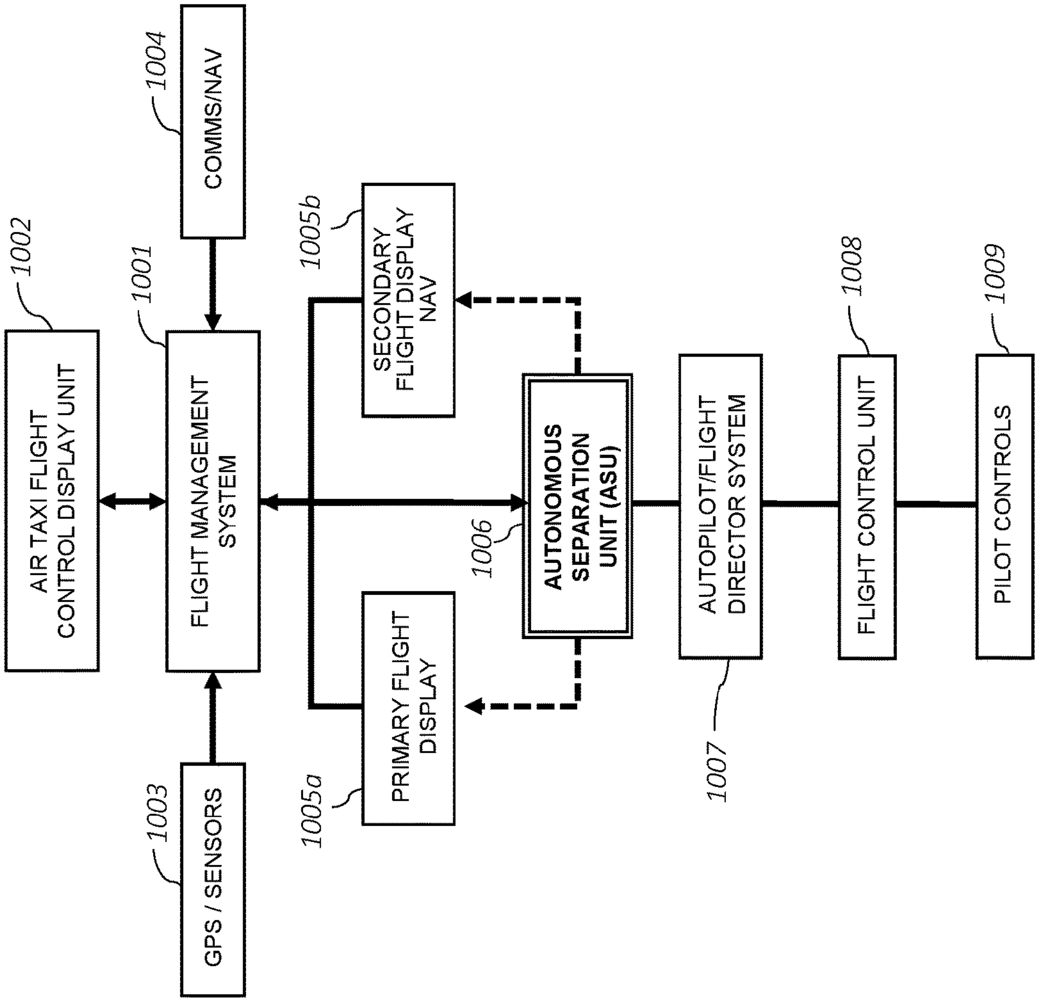
Figure 11:
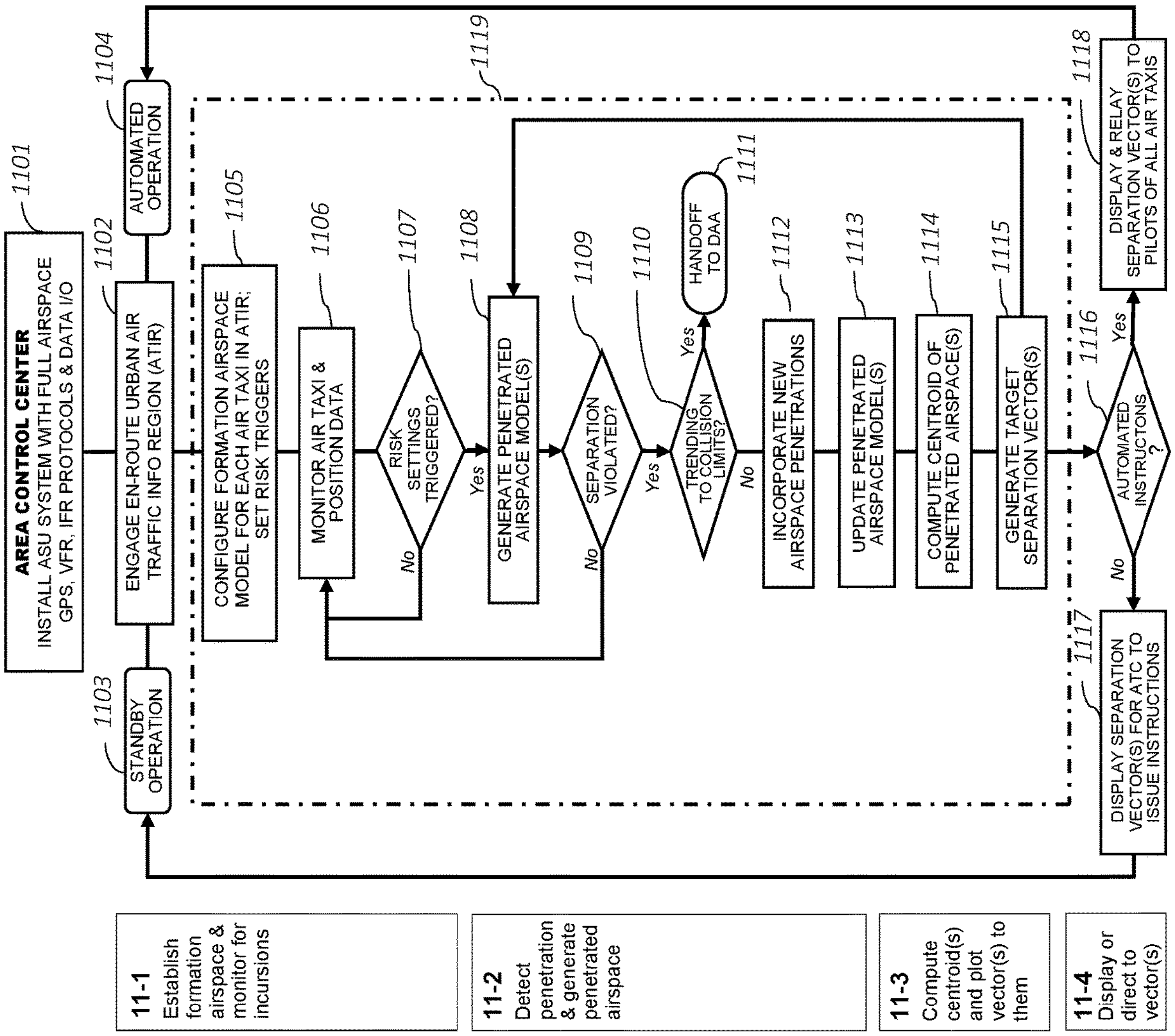

In FIG. 5A two diameters are drawn from the perimeter of the bubble, the intersection of which is at the centroid of the circle, which is also the centroid of the earlier bubble;

In FIG. 5B, two air taxis are shown having penetrated the reference formation airspace, violating the safe spacing represented by the bubble, and a location identifying the new centroid of the now deformed airspace;

FIG. 6A illustrates in two dimensions the standard reference formation airspace in which each of the four virtual air taxis is on station at the minimum safe airspace position relative to the center reference air taxi;

FIG. 6B shows the same airspace as FIG. 6A but with two of the left side air taxis penetrating into the reference formation airspace, and the center air taxi taking action to move to a new centroid position based on the shape of the penetrated airspace;

FIG. 7A illustrates the reference formation airspaces of two air taxis that are at a safe separation distance;

FIG. 7B illustrates the same reference formation airspaces of FIG. 7A but where each airspace has been violated, turning them into penetration airspaces with new centroids and complementary movements of each air taxi in independently moving to its own centroid position, and contained by the surrounding virtual air taxis;

FIG. 8 illustrates, according to an embodiment, instrument panels displaying a penetrating air taxi and a central reference air taxi and the flight path of each air taxi being vectored to its respective centroid to restore separation;

FIG. 9 is a process flow diagram illustrating the steps performed by an autonomous separation unit (ASU) according to an embodiment;

FIG. 10 illustrates, according to an embodiment, a system block diagram and flow chart of an autonomous separation unit installed in an air taxi in relation to the flight management system, display units, and flight director systems;

FIG. 11 is a process flow diagram illustrating the steps performed by an autonomous separation unit deployed in an air traffic control region according to an embodiment.

DETAILED DESCRIPTION

Figure 1:
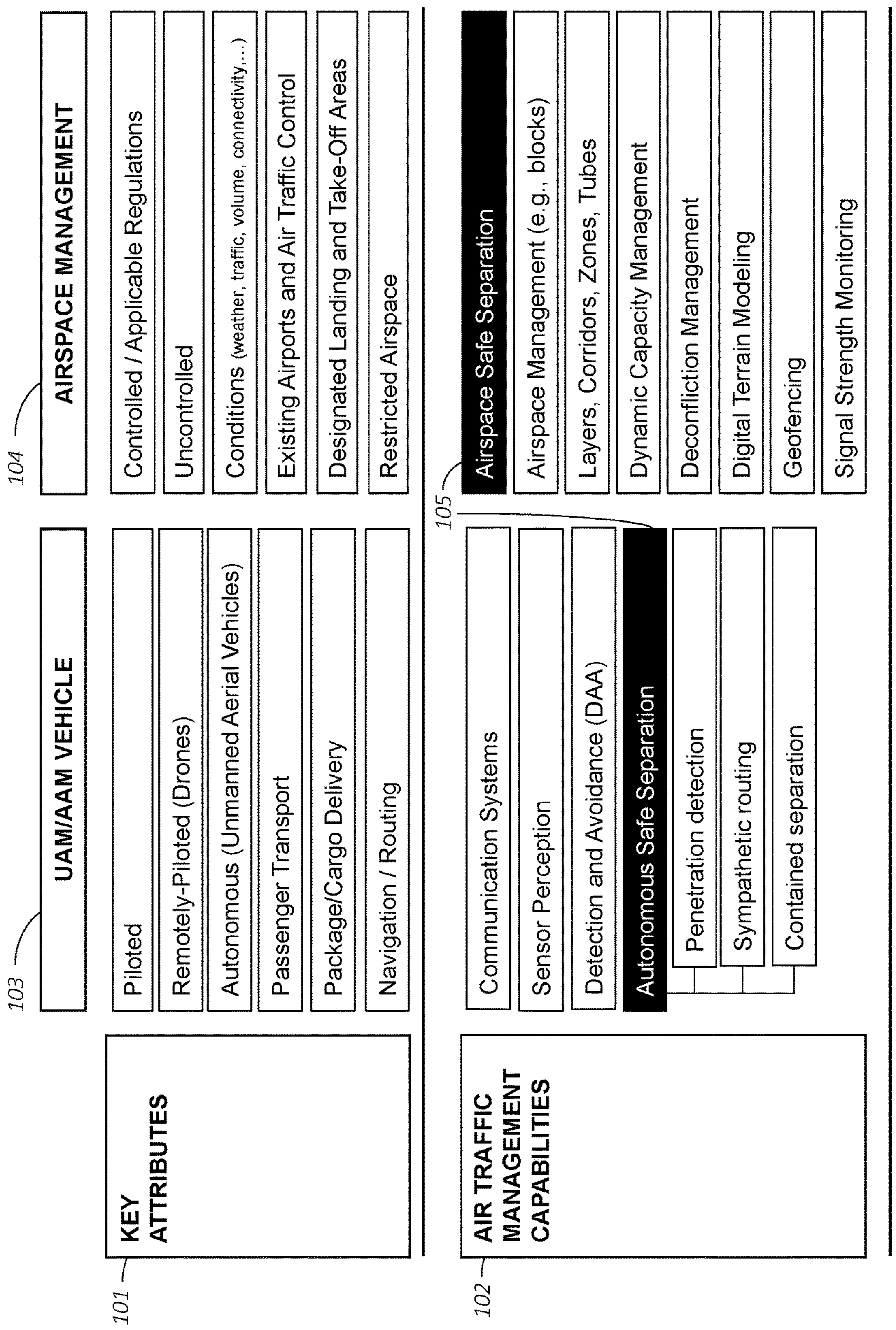
FIG. 1 is a table outlining the key attributes and core air traffic management (ATM) capabilities in the UAM vehicle and UAM air space management domains.

Turning to FIG. 1, a table outlining the key attributes 101 and core air traffic management (ATM) capabilities 102 of UAM vehicles 103 and UAM airspace 104 is shown. The major characteristics, vehicle types, and attributes down to navigation and routing are shown in the upper left of the table pertaining to UAM vehicles, ranging from piloted and autonomous to drones. Air Traffic Management (ATM) is accomplished by a combination of capabilities across both vehicle and airspace domains. Customarily, vehicle contribution to safe separation is a combination of simple communications, regulated visibility, and sensors capable of apprehending surrounding air traffic. Eventually, onboard capabilities such as radar and distance measuring equipment (DME) similar to that found in autonomous land vehicles might be deployed as traffic densities increase. Presently, however, and into the foreseeable future, airspace management methods will prevail as the arbiter of safe separation in all circumstances other than imminent collision, for which onboard detection and avoidance (DAA) equipment provides the key vehicle capability.

By contrast, the present disclosure describes a technology enabling individual air taxis and similar UAM vehicles to create their own (autonomous) safe separation. As noted earlier, autonomous safe separation requires three conditions be met: (a) detecting when an air taxi has penetrated the airspace of a reference or center air taxi; (b) independently generating mutually compatible or "sympathetic" routings to restore safe separation; and (c) automatically containing the direction and range of separation restoral so that the potential for moving into the path of another air taxi is forestalled. With these conditions met, autonomous safe separation is a vehicle-borne air traffic management capability fully compatible with the airspace-based air traffic management.

Figure 2:
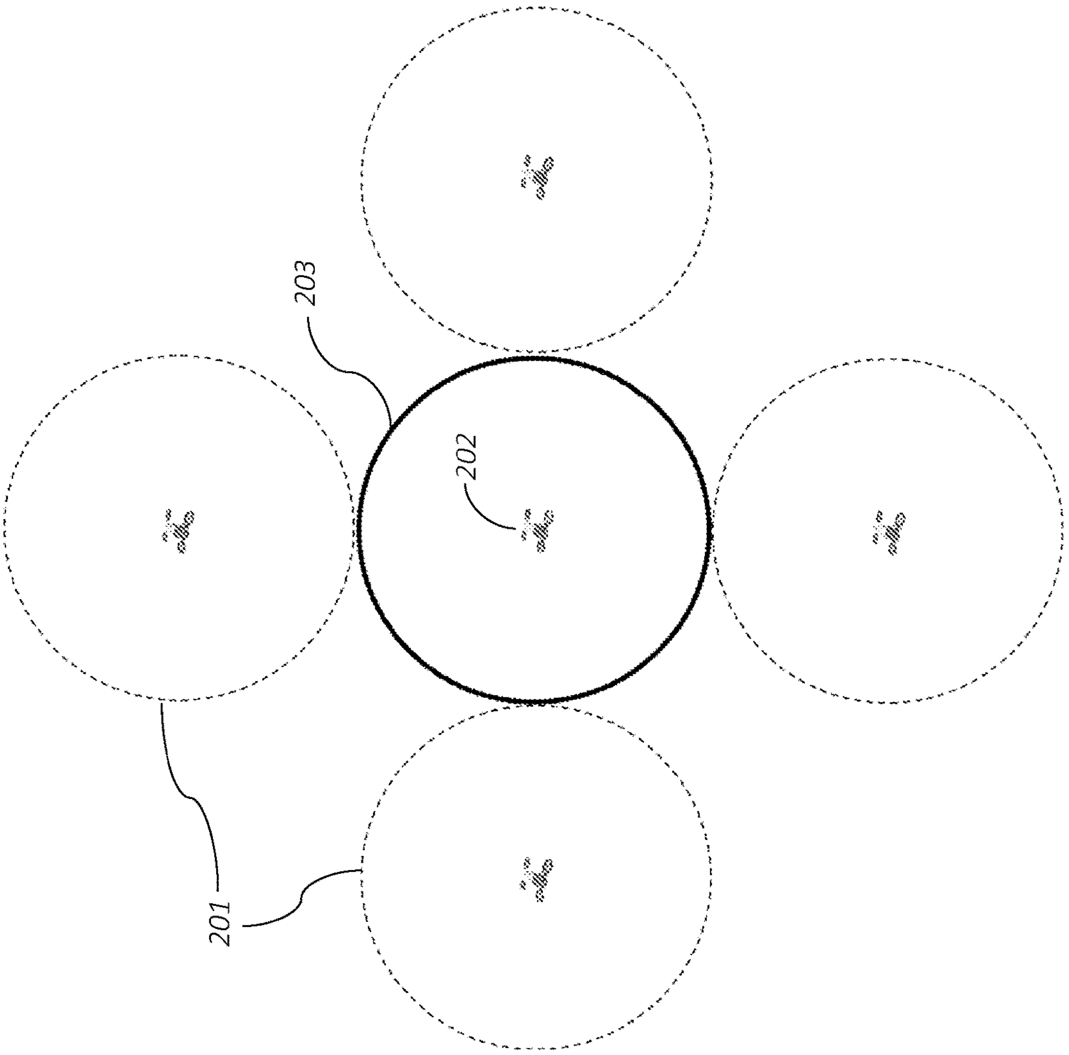
FIG. 2 illustrates an array of "surrounding air taxis," those immediately relevant to the maintenance of minimum separation standards longitudinally, laterally, and vertically with respect to the center reference air taxi.

FIG. 2 illustrates the positions of the minimum separation circumferences 201 of four air taxis in relation to the center reference air taxi 202 circumference 203. This is the minimum number of air taxis that can surround the center air taxi without directly intersecting each other's separation spheres or bubbles. Note, however, that since each circumference subtends the safe separation around its own air taxi, each air taxi is located twice as far from minimum separation as needed. The air taxis surrounding the center reference taxi are even further from each other.

Figure 3:
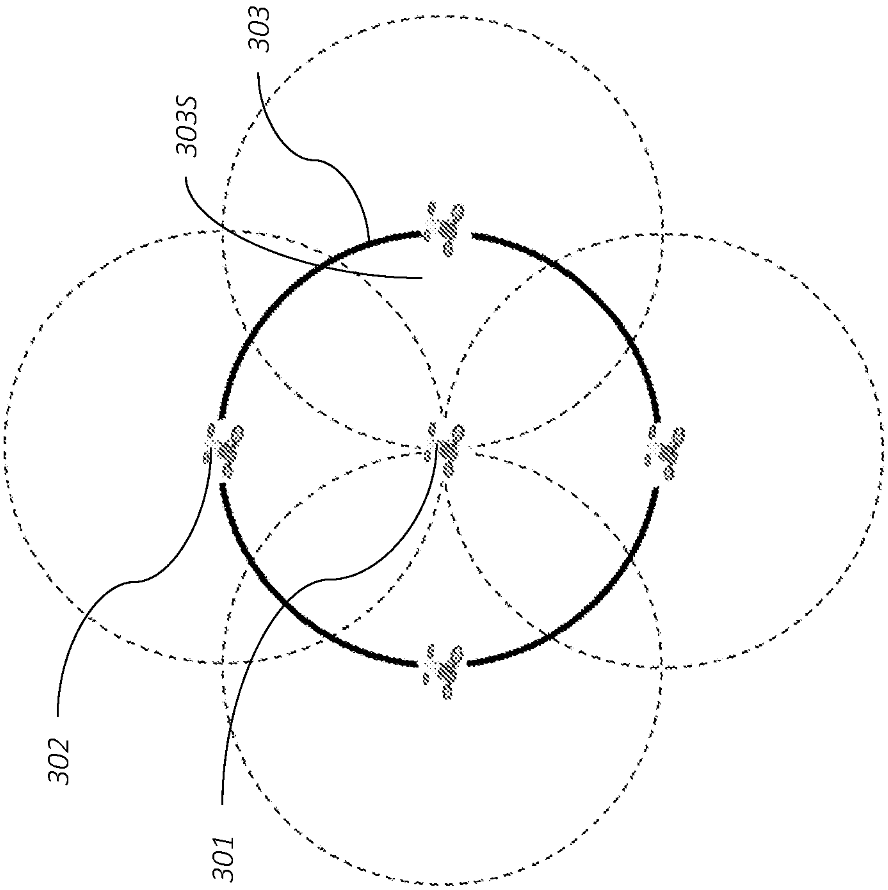
FIG. 3 shows the same array of separation-relevant surrounding air taxis as in FIG. 2, compressed into their minimum separation space, thus creating the reference formation airspace of virtual air taxis surrounding the center air taxi.

FIG. 3 adopts the perspective of the center air taxi and collapses the distance to all four air taxis 302 so each is exactly at the edge of the safe separation distance of the center reference air taxi's 301 perimeter 303. Since the actual safe separation spacing in an embodiment may be represented by a sphere, an air taxi at any position on the perimeter of such a sphere 303S is at the minimum safe separation distance. The reference formation airspace 303S of the center reference air taxi 301 is the minimum separation airspace, and is subtended by the positions of all the air taxis 302 located around the perimeter of the airspace 303. This formation airspace 303S around the center reference air taxi 301 is a mathematical construct with an interior space and a specifically defined outer surface or perimeter 303 populated here by the virtual air taxis 302. The reference formation airspace 303S moves continuously as the center reference air taxi 301 moves. Computationally, the location of the perimeter of the reference formation airspace 303 is known, and therefore its penetration by any other air taxi can also be determined if that air taxi is detected. Similarly, ascertaining the location (through calculation or sensing) the position of the penetrating air taxi also enables computation of the depth, velocity, and direction of penetration with respect to the reference formation airspace 303S.

Figure 4:
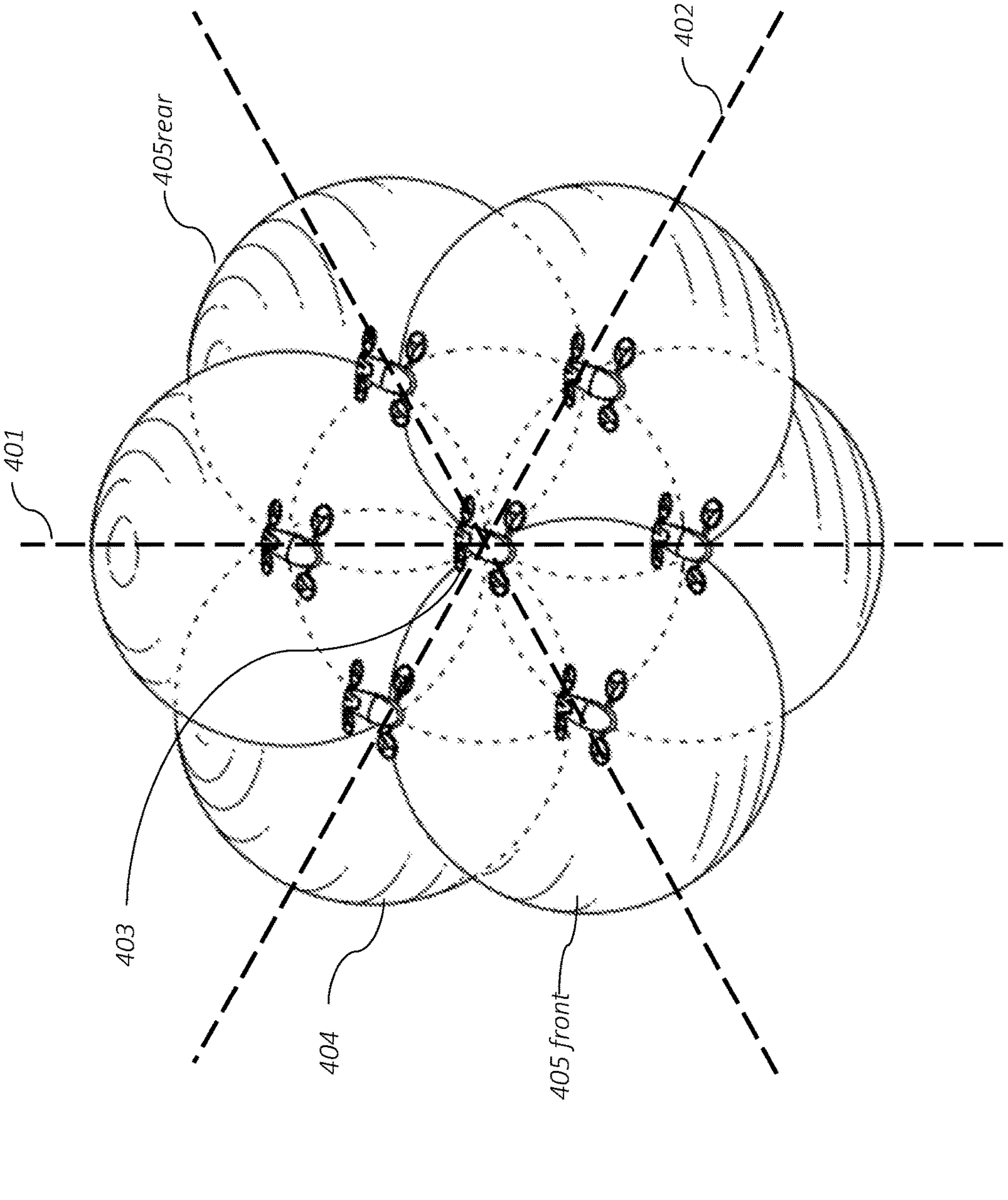
FIG. 4 shows how six air taxis combine to form a "bubble" with the same coverage shown in FIG. 3, but here shown in three dimensions.

FIG. 4 illustrates, according to an embodiment, the structure of the airspace when viewed in three dimensions. Whether seen from the perspective of axis 401 or 402, the view is identical. Where the axes intersect at the center reference air taxi 403, the view is of three identical spheres extending "into" the page. The center reference air taxi is located at the center 403.

FIG. 5A depicts the equilibrium airspace at 503A. The center of the air taxi space, is known as the centroid of the reference formation airspace, is calculated as the mean position or "center of gravity" of a geometric shape having diameters of 502A and perimeter 501A. The reference formation airspace of an air taxi located at the center 503A would not be penetrated.

FIG. 5B illustrates, according to an embodiment, the concept of the centroid in the context of a reference formation airspace penetrated by two real air taxis. For purposes of illustration in FIG. 5B and following, virtual air taxis are illustrated with a dashed circle, and real air taxis, such as penetrating air taxis, are represented with a solid circle. As illustrated, the original reference formation airspace 501B has been modified and deformed by the air taxis that have penetrated the reference formation airspace. According to an embodiment, the reference formation airspace is modified by replacing virtual air taxi positions with penetrating air taxi positions to form the penetration airspace. In an alternative embodiment, the reference formation airspace may be deformed by utilizing the position of a penetrating air taxis as an additional point, in addition to the positions of the virtual air taxis, to form the penetration airspace. In the illustrated embodiment in FIG. 5B, two virtual air taxis have been replaced by two penetrating air taxis to form the penetrated airspace 501C. Even such a completely deformed penetration airspace still has a centroid 503B whose location relative to all the vertices of the penetration airspace 501C can be computed as the centroid of the geometric shape defined by the two penetrating air taxis and the two virtual air taxis.

FIGS. 6A and 6B illustrate, according to an embodiment, modification of a reference formation airspace resulting in creation of a new penetrated airspace as the basis for determining a new centroid position and a target separation vector to which the reference air taxi should move to reestablish safe separation as closely as feasible. Reference formation airspace 601A contains the set of virtual air taxis about the perimeter of the reference formation airspace constructed as a circle (in this two-dimensional illustration) with dimensions based on target safe separation parameters of a radius of the circle being the minimum separation distance. In addition to the two virtual air taxis, air taxis 602A and 603A represent real air taxis also at the boundary of the reference formation airspace 601A.

FIG. 6B illustrates the arrangement where the two real air taxis 602B and 603B have penetrated the reference formation airspace 601A, thus deforming the reference formation airspace 601A, and leading to the creation of new penetrated airspace 601B consisting of the virtual air taxis from the reference formation airspace 601A but with two of the closest virtual air taxis replaced with the two penetrating air taxis 602B and 603B. Thus, penetrating air taxis 602B and 603B are shown defining the new penetration airspace 601B with its newly-calculated centroid at 604. To start reestablishing separation, a target separation vector 606 is calculated based upon the current position of the air taxi 605 to the position of the centroid 604. The target separation vector 606 is supplied to air taxi 605 so it can navigate along the target separation vector 606 toward the penetrated airspace centroid 604 thereby regaining or approaching safe separation. Centroid position 604 will always represent a position that moves away from the location of any penetrating air taxis, while also being moderated by the remaining virtual air taxi positions. The nature of the centroid computation is to restore the mean balance across all vertices of the penetration airspace, and this tendency is toward safe separation, because this movement is away from proximity, and will be complemented by other air taxis equipped with ASU technology that will also be moving in complementary directions away from air taxi 605 as will be explained in connection with FIG. 7. This functional action of moving away in complementary directions without interaction is referred to as "sympathetic routing."

Turning to FIG. 7A, the experience of one of the penetrating air taxis in the prior example will now be described. Two air taxis 702A and 704A equipped with autonomous separation unit capability are shown under normal conditions, where neither air taxi has yet penetrated the airspace of the other. Each air taxi is flying within its reference formation airspace, namely, reference formation airspace 701A for air taxi 702A and reference formation airspace 703A for air taxi 704A, both positioned on the outer perimeter of the minimum required separation airspace. The reference formation airspaces overlap as noted in FIG. 4, and in an embodiment, satellite GPS data or sensors are informing each air taxi of the presence of the other. Again, for purposes of notation, each real air taxi 702A and 704A is illustrated with solid circles, while the virtual air taxis framing the reference formation airspaces are illustrated with dashed circles. A penetration occurs when, in FIG. 7B, air taxi 704A has shifted to position 704B, possibly due to wind shear driving the air taxi off course. This transition to penetration "deforms" the perimeters of the reference formation airspaces of both air taxis, since separation has been penetrated for both, thus generating new penetrated airspaces 701B and 703B now containing a combination of virtual air taxis belonging to the original reference formation airspace at a safe separation distance, and an actual penetrating air taxi. In the case of air taxi 702B, penetrating air taxi 704B defines a point of its penetration airspace 701B. In the case of air taxi 704B, one penetrating air taxi 702B is involved in generating its penetration airspace 703B. Irrespective of which air taxi is at fault for causing the penetration, both are at an unsafe distance, both original reference formation airspaces have been penetrated, and the ideal response is for each to take sympathetic action to restore safe separation.

The ASU system in air taxi 704B calculates a new centroid based on its penetration airspace 703B, generating the new centroid position 704CENT among all points of the now-changed airspace. Similarly, air taxi 702B recalculates its own new centroid 702CENT based on the deformations imposed by air taxi 704B. The centroid 704CENT is located deeper into its penetrated airspace and further from its current position because the rest of the original perimeter of the airspace remains intact and serves to contain the continued movement away from the incursion. This functional action contains further separation by imposing virtual boundaries. This third and final capability establishes autonomous separation: penetration detection, sympathetic routing, and now, contained separation.

FIG. 8 illustrates, according to an embodiment, the visual displays of two air taxis illustrating the Autonomous Separation Unit trajectory information. The display 801A shows the situation as reflected in the penetrated airspace 703B, with air taxi call sign U972. The display for penetrated airspace 701B is shown in display 801B and is identified as belonging to air taxi A231. Each display shows both air taxis, since each is inside the reference formation airspace of the other. UA972's display 801A is at the left bottom. In this display, air taxi A231 appears as the bold dash circle air taxi 803A, including its identifying mark, current speed, and altitude. The hatched arrow 802B shows that A231 803A is the air taxi whose display is to the right. Similarly, A231's display 801B is shown at the right bottom, and penetrating air taxi U972 803B is illustrated circled in bold dashed lines in the upper left quadrant of the radial display with its identifying call sign, speed and altitude. The hatched line 802A shows that air taxi U972 803B is the air taxi whose display is to the left. In this situational context, and based on the background computation of the respective centroid locations within each penetrated airspace 701B and 703B, each display shows recommended target separation (SEP) vectors 804A and 804B that each air taxi should pursue, indicating the system-determined direction and speed autonomously provided by each air taxi's ASU system. In display 801A, the vector arrow 804A shows the system-determined target vector from air taxi A231. Similarly, separation vector 804B in display 801B identifies the target separation vector proposed for air taxi A231 as it seeks separation from air taxi U972. Each separation vector leads to the respective centroid destination generated autonomously by each system relative to its own penetrated airspace. Accordingly, both separation vectors move sympathetically away from each other to reestablish separation; all without any communication or central control.

In an embodiment, a target separation vector may be "combined" with a current flight vector of an air taxi, to guide the air taxi towards the centroid as it continues its flight.

Any number of penetrations can be addressed, resulting only in the potential tightening of the airspace in which the centroid location is computed. Further, while the virtual air taxis are used to frame the reference formation airspace and typically at least a portion of a penetration airspace, these virtual air taxis are not real, and thus offer no risk of real danger even as the centroid draws closer. In fact, the framing virtual air taxis establish the closest location of potentially penetrating real air taxis and circumscribe the range of movement of air taxis as the restoration of safe separation is underway.

FIG. 9 illustrates, according to an embodiment, the process flow performed by the autonomous separation unit installed on an air taxi. The four boxes to the left highlight the major stages of the process flow: in stage 9-1, the system establishes the reference formation airspace and monitors for penetrations based on GPS and related positioning data; in stage 9-2 penetration is detected and the penetrated airspace model is generated; in stage 9-3 the penetration airspace centroid position is computed and a target separation vector to that location is plotted; and in stage 9-4 the target separation vector is either displayed or supplied to an autopilot system of the air taxi to assume a heading according to the target separation vector.

In step 901, operation of the ASU is initiated by ensuring the air taxi ID is entered, the transponder is set, GPS and/or sensor signals can be received, and that in an embodiment both broadcast and reception to and from ATC and other air taxis are enabled. In modern air taxis a flight management system is activated in step 902, and can be set to manual 903 or autopilot 904 operation of the air taxis. In step 905, the system is configured to establish the reference formation airspace that creates a sphere around the air taxi at the safe distance longitudinally, laterally, and vertically. In addition, in an embodiment, risk triggers 907 can be set to govern how far away a potentially-penetrating air taxis should be before being tracked by the system and considered a threat, and when the proximity of an air taxis is such that the separation system is suspended and the Detection and Avoidance (DAA) system 911, takes over.

Once airborne, in step 906 the ASU system monitors broadcast or sensor data from GPS and other air taxi data, and in step 907 assesses the degree to which any air taxi may pose a trigger-level risk. If the threat from an approaching air taxi is deemed a sufficient risk, in step 908 the system will generate a penetration airspace. In an embodiment, a set of virtual air taxis spaced about the perimeter of the penetration airspace may be defined, and virtual air taxis may be replaced or substituted with the data from the nearest-risk, real approaching air taxi(s). In step 909, the approaching air taxi is evaluated to determine if it has penetrated the reference formation airspace of the air taxis. If the approaching air taxi does not breach the separation distances, the system returns to monitoring for vicinity air taxis in step 906. On the other hand, in step 909, if separation is violated and the approaching air taxi has penetrated the reference formation airspace, then in step 910 the incoming distance is checked to see if it is so close and closing so quickly that the system automatically hands off to DAA in step 911. However, if in step 910 DAA is not triggered, the penetration data—for current and additional air taxis if any—is incorporated in step 912, and the updated penetration airspace is constructed in step 913. In step 914, the centroid of the penetration airspace is computed, and in step 915 the target separation vector is generated. In step 916, if in an embodiment the autopilot is engaged, then in step 918 the target separation vector is displayed and supplied to the autopilot system for the air taxi to navigate to the centroid along the target separation vector which will reestablish safe separation. If the autopilot is not engaged, then in step 917 the target separation vector information is displayed, possibly with an audible or visual indicator alerting the pilot to the penetration and the recommended target safe separation vector. Further, after the target separation vector is generated in step 915, the process returns to step 908 to continuously update the penetrated airspace until, in step 909, it determines that a separation violation no longer exists.

FIG. 10 illustrates, according to an embodiment, the Autonomous Separation Unit (ASU) 1006 as deployed in relation to the onboard air taxi systems with which the ASU interacts. In an embodiment, the Flight Management System 1001 receives and processes information from a GPS or sensor system 1003, as well as information from communication and navigation units 1004, which identify its position and receive and process other data, including in an embodiment from air traffic control as well as other air taxis. This information and the data and images generated as a result of its interpretation are displayed on flight display units 1005*a* and 1005*b*. Together, these displays show the attitude, altitude, airspeed, and heading of the air taxi and the surrounding air taxis and related situational data. The Autopilot/Flight Director System 1007 that in an embodiment enables the pilot to disengage the autopilot and take manual control of the air taxi, engaging the Flight Control Unit 1008 to access and manage the fly by wire controls 1009 guiding the multiple facets of air taxi attitude, angle of attack, airspeed, tunnel path, and other flight characteristics.

According to an embodiment, the Autonomous Separation Unit 1006 may be installed and interfaced with direct access to the flight management system 1001, in order to facilitate the display of information such as the separation trajectory as shown in FIG. 8, and may send flight data directly to the autopilot system 1007 or send only navigational data to the display units 1005*a* and 1005*b*, in the case of manual control of the air taxis through the flight control unit 1008 and fly by wire controls 1009.

FIG. 11 illustrates, according to an embodiment, the steps performed by the autonomous separation unit system when deployed in a UAM air traffic control or equivalent-function setting. The four boxes to the left highlight the major stages of the routine performed by the autonomous separation unit: in step 11-1, the system establishes the reference formation airspaces and monitors data for all designated flights based on received GPS and related area positioning data; in step 11-2, the system detects penetration and generates the penetrated airspace model for any air taxis experiencing separation, including multiple incidents; in step 11-3, the system computes the penetrated airspace centroid positions and generates the target separation vectors to those centroid positions; in step 11-4, the system either displays or directs the air taxis to assume headings according to their respective separation vectors.

In an embodiment, the ASU system is integrated with the Area Control Center 1101 and is interfaced with the available directional and communications systems. In an embodiment, as indicated in step 1102, the ASU is deployed en-route in an urban air traffic information region (ATIR) role, referring to a non-airport-based control center that is primarily engaged in managing air taxis en-route to their destinations and thus not within the control of origin or destination launch and landing points. In an alternative embodiment, the ASU may be deployed at an airport. The ASU can be operated in standby mode 1103 supplying data and information to controllers who would then review, amend if needed, and transmit the recommended separation actions to multiple air taxis. Alternatively, operating in an automated mode 1104, the Area Control Center-based ASU transmits instructions to multiple air taxis simultaneously after tracking and computing individual reference formation airspaces and, when needed, penetration airspaces for multiple air taxis, and determining their target separation vectors as needed.

In addition to separation management for minimum-space adherence purposes, the ASU can also compute and transmit trajectories designed to optimize fuel efficiency and limit emissions. The specific operation of the ASU in an Urban Air Traffic Information Region tracking multiple air taxis and with full access to GPS and all related sensor, positioning, navigation, and air taxi transponder and communications performs the following representative steps:

a. In step 1105, the ASU establishes the reference formation airspace for each air taxi in its flight information region, and sets risk triggers across all three dimensions of longitude, latitude, and altitude.

b. Next, in step 1106, the ASU continues to gather information from Area Control Center inputs (GPS and related sensors and data), preparing to respond when, in step 1107, risk limits are triggered; otherwise, the system continues monitoring.

c. When a risk limit is triggered and a reference formation airspace penetration is imminent, in step 1108, the ASU generates models of the projected penetration, awaiting confirmed determination that penetration has occurred in step 1109. If, in step 1110, the confirmed penetration occurs at such a rapid pace that there is a risk of air taxi collision, the ASU so warns the pilots of the air taxis involved and instructs the respective pilots in command rely on onboard detection and avoidance (DAA) systems 1111 aboard all air taxis so individual pilots with situational awareness can address the relevant risks directly.

d. In step 1112, in a dynamic situation potentially involving additional air taxis, surveillance of the airspace continues specifically to detect any additional penetration or triggered risks of penetration that need to also be managed.

e. In step 1113, as the penetrated airspace continues to evolve, the overall penetrated airspace modeling and status are continually updated.

f. Then, in step 1114, the ASU then generates the centroid location of the penetrated airspace of each air taxis at risk, and the centroid position is then used to set the target separation vector in step 1115.

g. In step 1116, Air Traffic Controllers can set or neutralize the automated instructions to air taxis, supporting either display-only, in step 1117, or display and instruct in step 1118.

h. The dotted line demarcation 1119 in FIG. 12 marks the scope of ASU operations in an Urban Air Traffic Information Region/Air Traffic Control deployment of the Autonomous Separation Unit, according to an embodiment.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The invention claimed is:

1. A method for managing air taxi flight separation of a reference air taxi during flight for compliance with a predetermined separation distance that includes minimum longitudinal, lateral and vertical separation parameters, the method comprising:

receiving a current flight vector for the reference air taxi, receiving position data of the reference air taxi, constructing a reference formation airspace in the form of an ellipsoid, an ovoid, or other non-spheroidal shape with dimensions based upon the minimum longitudinal, lateral, and vertical separation parameters and the position of the reference air taxi as the centroid of the reference formation airspace, receiving position data of at least one other air taxi that has penetrated into the reference formation airspace, constructing a penetration airspace representing a modification of the reference formation airspace deformed by at least the position data of the at least one other air taxi, determining a centroid of the penetration airspace, determining a target separation vector for the reference air taxi representing a direction to the centroid of the penetration airspace, and determining a new flight vector for the reference air taxi based upon the current flight vector combined with the target separation vector, sending to the reference air taxi the new flight vector.

2. The method according to claim 1 further comprising the steps of:

defining a plurality of virtual positions spaced about the surface of the reference formation airspace, and wherein the penetration airspace is represented by the plurality of virtual positions and the position of the at least one other air taxi.

3. The method of claim 2 wherein the plurality of virtual positions comprises a set of 6 positions.

4. The method of claim 1 further comprising the steps of:

defining a plurality of virtual positions spaced about the surfaces of the reference formation airspace, and wherein the penetration airspace is represented by the plurality of virtual positions and one of the plurality of virtual positions is substituted with the position of the at least one other air taxi.

5. The method of claim 4 wherein the plurality of virtual positions comprises a set of 6 positions.

6. The method according to claim 1 where the target separation vector for the reference air taxi is determined based at least in part on limiting emissions of the reference air taxi.

7. The method according to claim 1 where the target separation vector for the reference air taxi is determined based at least in part on optimizing fuel efficiency of the reference air taxi.

* * * * *